(12) United States Patent
Rice, Sr.

(10) Patent No.: US 7,568,306 B1
(45) Date of Patent: Aug. 4, 2009

(54) ROD HOLDING APPARATUS

(76) Inventor: James D. Rice, Sr., 18 Tennessee La., Auburndale, FL (US) 33823

( * ) Notice: Subject to any disclaimer, the term of this patent is extended or adjusted under 35 U.S.C. 154(b) by 0 days.

(21) Appl. No.: 12/077,933

(22) Filed: Mar. 24, 2008

(51) Int. Cl.
*A01K 97/10* (2006.01)
(52) U.S. Cl. .................................. 43/21.2; 248/530
(58) Field of Classification Search ............... 43/21.2; 248/530
See application file for complete search history.

(56) References Cited

U.S. PATENT DOCUMENTS

| | | | |
|---|---|---|---|
| 1,521,265 A * | 12/1924 | Anderson | 29/275 |
| 1,577,612 A | 3/1926 | Dees | |
| 2,196,472 A * | 4/1940 | Moriarty | 43/21.2 |
| 2,414,358 A | 1/1947 | Calway | |
| 2,629,985 A * | 3/1953 | Taylor | 173/91 |
| 3,182,937 A | 5/1965 | Manning | |
| 3,381,763 A * | 5/1968 | Matson | 173/91 |
| 3,519,234 A * | 7/1970 | Matson | 248/156 |
| 4,315,551 A | 2/1982 | Iannone | |
| 4,443,963 A * | 4/1984 | Braaten | 43/21.2 |
| 4,455,779 A * | 6/1984 | Cosic | 43/17 |
| 4,557,409 A * | 12/1985 | Hecock et al. | 227/147 |
| 4,866,873 A * | 9/1989 | Van Valkenburg | 43/21.2 |
| 5,086,849 A | 2/1992 | Dahl | |
| 5,639,057 A | 6/1997 | Yeomans | |
| 6,318,017 B1 | 11/2001 | Genardo | |
| 6,364,031 B1 | 4/2002 | Amicangelo | |

\* cited by examiner

*Primary Examiner*—Kurt Rowan
(74) *Attorney, Agent, or Firm*—William M. Hobby, III

(57) ABSTRACT

A rod holding apparatus has a tube having ground penetrating stakes at one end for attaching into the earth for removably supporting a fishing pole or umbrella or the like. The rod holding apparatus incorporates a slide hammer for driving the stake into the ground.

5 Claims, 2 Drawing Sheets

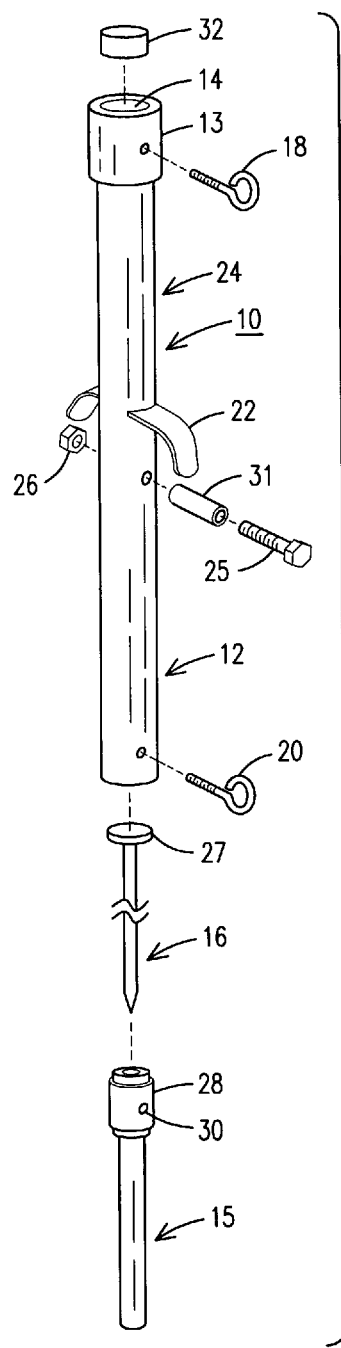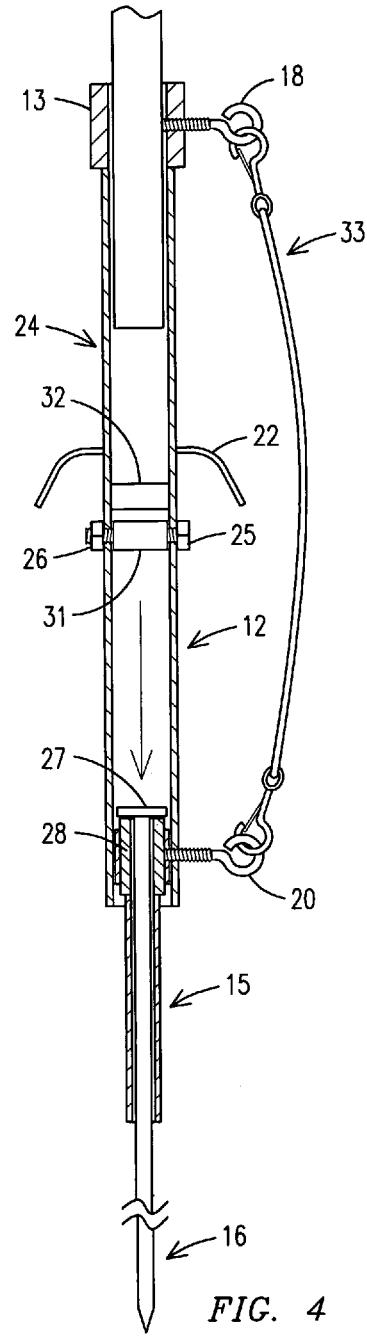
FIG. 3
FIG. 4

ROD HOLDING APPARATUS

BACKGROUND OF THE INVENTION

The present invention relates generally to holders for rods or poles such as fishing poles and umbrellas, especially to rod holders which are supported in the ground by a ground penetrating stake.

Fishing pole holders supported in the ground by a ground penetrating member are well known in the art. They generally include a tube for inserting a fishing pole or rod into one end and have a spike sticking out the other end for jabbing into the ground. Once the fishing pole holder spike has been driven into the ground, the fishing rod handle can be inserted into the hollow tube for supporting the fishing rod while fishing on the beach or river bank or the like.

There have been a number of prior art patents directed towards fishing rod holders and these include the Genardo U.S. Pat. No. 6,318,017 for a fishing rod holder apparatus which allows a stake to be driven into the ground for holding a fishing rod holder and the Dees U.S. Pat. No. 1,577,612 for a fishing pole holder which drives a stake mounted on the end of a hollow tube into the ground so that a fishing pole can be inserted into the hollow tube. The Manning U.S. Pat. No. 3,182,937 and the Yeomans U.S. Pat. No. 5,639,057 and the Calway U.S. Pat. No. 2,414,358 show other fishing rod holders having tubes or spikes mounted thereto for driving a spike into the ground and which supports the hollow tube which supports the fishing rod or fishing pole.

It has also been known in the past to have ground imbedded rods or posts in which a stake is driven into the ground with a sliding hammer which slides a hammer against a stake to hammer the stake into the ground. In the Iannone U.S. Pat. No. 4,315,551 a rod driver is illustrated having a bore therethrough with a driver head for driving a separate rod into the ground. The Hecock et al. U.S. Pat. No. 4,557,409 is an electrical grounding rod driving device using a slide hammer as is the Dahl U.S. Pat. No. 5,086,849 for an apparatus useful in driving electrical grounding rods. The Matson U.S. Pat. No. 3,381,763 is a removable ground penetrating stake which includes a slide hammer arrangement driving the stake into the ground. The Amicangelo U.S. Pat. No. 6,364,031 is also a rod driving and extracting tool and method.

The present invention is more specifically directed towards a rod holder for holding a fishing pole, fishing rod or umbrella or the like in which the rod or pole is inserted into an open ended tube and supported thereby but which simplies the attaching of the stake into the ground by the use of a sliding hammer built into the rod holder and which improves on the simplicity of manufacturing the device as well as in the use of the fishing rod holder.

SUMMARY OF THE INVENTION

A rod holding apparatus has an elongated rod holding tube having two end portions with one end portion being adapted to removably hold a rod or pole therein. An elongated stake has a head on one end and is generally pointed on the other end thereof. An elongated stake guide is fixedly attached in the rod holding tube other end for slidably supporting the stake therein. The stake guide has a stake head stop on one end thereof to hold the stake from sliding out of the stake guide and the elongated rod holding tube. A hammering member is fixedly attached in the rod holding tube between the ends thereof and is slidable with the rod holding tube to allow the hammer member to impact against the stake head when sliding the elongated rod holding tube on the stake to thereby hammer the stake into the earth. The hammering member may have a cushioning surface to cushion the blows when driving the rod into the ground. A mass or weighted member is attached in the rod holder tube to increase the force of the sliding hammer action and may also be the hammer member. The rod holding tube has a stake locking bolt threadedly attached therethrough and through the stake guide for locking the stake to the rod holding tube once the stake has been driven into the ground. One or more rod locking bolts may be threadedly attached through the rod holding tube through and onto the rod in the rod holding tube once the rod holder has been driven into the ground. The hammer member may be a metal rod extending through the rod holding tube and has cushioning attached therearound.

BRIEF DESCRIPTION OF THE DRAWINGS

Other objects, features, and advantages of the present invention will be apparent from the written description and the drawings in which:

FIG. 3 is an exploded perspective view of the rod holding apparatus of FIGS. 1 and 2; and FIG. 4 is a sectional view taken through the rod holding apparatus of FIGS. 1-3.

DESCRIPTION OF THE PREFERRED EMBODIMENT

Figures 1, 2:
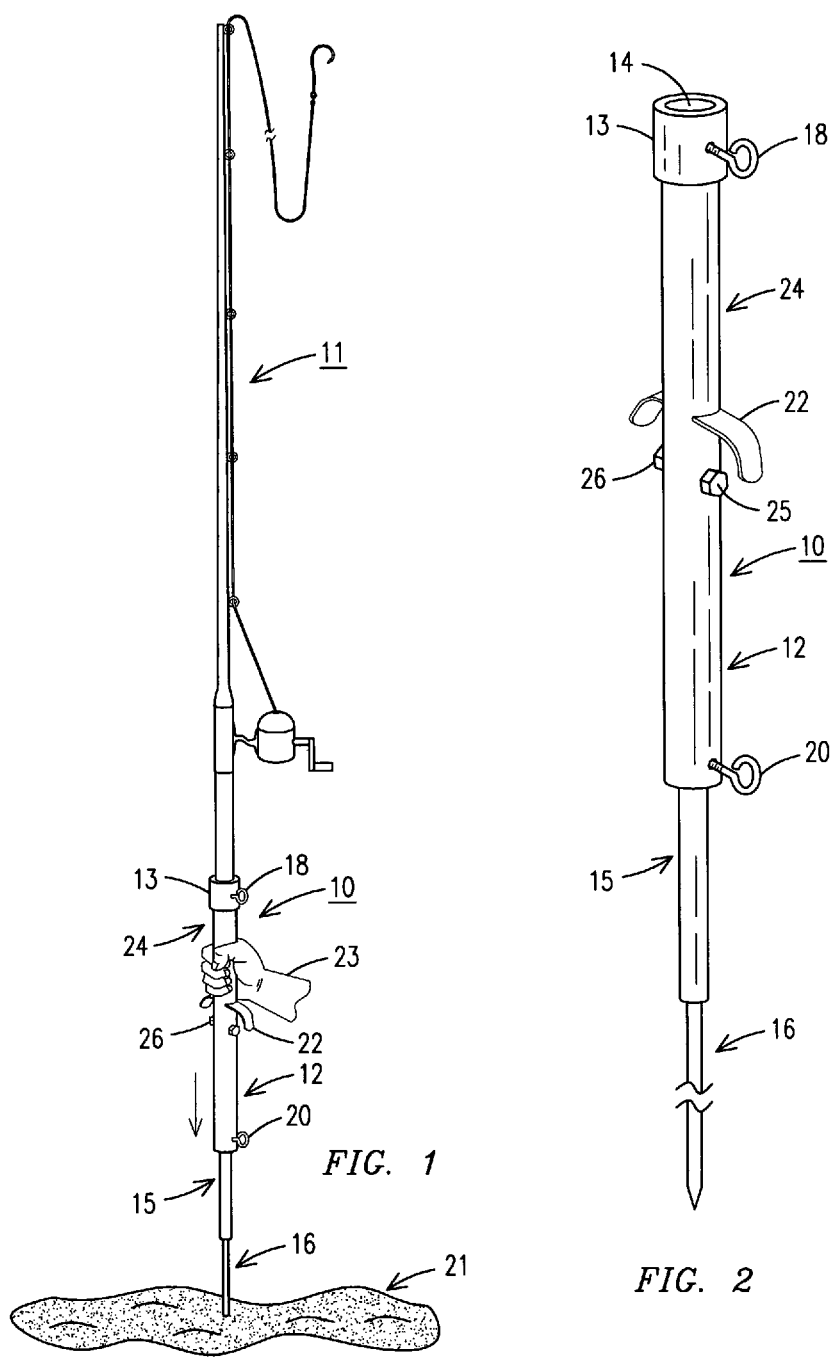
FIG. 1 is a perspective view of the present rod holding apparatus being driven into the ground and having a fishing rod attached thereto.
FIG. 2 is a perspective view of the rod holding apparatus in accordance with the present invention.

Referring to the drawings, FIGS. 1 through 4, a rod holding device 10 is shown in FIG. 1 having a fishing rod 11 supported therein. The rod holding apparatus 10 has a rod holding tube 12 which can be made of a polymer or plastic material as desired and has a collar 13 at one end having an opening 14 for a bore therein. A stake guide 15 is shown extending into the opposite end of the rod holding tube 12 and has a elongated pointed stake 16 having a generally pointed end 17. The rod holding tube 10 has an eye bolt 18 threadedly attached through the collar 13 of tube 12 and which is used to stabilize or hold a rod being supported in the rod holding tube 12. A second eye bolt 20 is attached at the opposite end of the rod holder tube and is threadedly attached thereinto for tightening down upon the stake 16 once the stake is driven into the earth 21. The rod holding tube also has a pair of hand guards 22 extending therefrom so that a person's hand 23 can grip the gripping portion 24 of the rod holder tube and operate the rod holding tube as a slide hammer without the hand 23 sliding down the tube. Hammering member 25 is formed with a bolt passing through the rod holding tube 12 and which is attached to the tube with a nut 26.

As more clearly seen in FIGS. 3 and 4, the stake 16 has a head 27 thereon and freely slides within the stake guide 15 with the head extending into the rod holding tube 12. The stake guide 15 also has a fixedly attached collar 28 for use to fixedly attach the stake guide 15 to the rod holding tube 12. A threaded hole 30 extends into the collar 30 and through the stake guide 15 so that the eye bolt 20 can be threaded therethrough and clamped down onto the stake 15 to lock the stake in place once the stake has been driven into the earth 21. As also seen in FIG. 3, the hammering member 25 has a rubber sleeve 31 which is a cushioning sleeve for the hammering member 25 and is positioned inside the rod holding tube 12. In FIG. 4 a weighted mass 32 has been fixedly attached within the rod holding tube 12 and a carrying strap 33 has been attached in the eye bolts 18 and 20 so that the rod holder apparatus can be easily carried over the shoulder or arm as desired.

In operation, as more clearly seen in FIG. 4, the rod holding tube 12 can be gripped, as seen in FIG. 1, while driving the stake into the earth 21, as seen in FIG. 1. The rod holding tube can then be moved up and down to drive the hammering member 25 against the stake head 27 with a repeated motion to drive the stake into the earth 21. This action has the rod holding tube 12 and the stake guide 15 sliding on the stake 16 to drive the hammering member 25 against the stake head 27 to drive the stake into the earth or into the sand. Repeatedly sliding the rod holding tube 12 and hammering member 25 up and down hammers the stake 16 by the hammering member 25 repeatedly hitting the stake head to drive the stake into the ground. Once the stake is driven into the ground, the eye bolt 20 can be rotated to lock the rod holding tube in place and a fishing rod handle or umbrella or the like can be inserted into the open bore 14. The rod or pole in the tube 12 can be further stabilized by threading the eye bolt 18 thereagainst. The rod holding device can be easily removed from the earth after removing the fishing rod 11 by merely lifting or pulling the stake out of the ground. The carrying strap is used to tote the rod holding device.

It should be noted that the weight 32 can also be used as a hammer and may be attached within the polymer tube 12 with an adhesive and may be a metal weight, such as cast iron, steel, or the like. The stake guide 15 may be made of plastic but the stake 16 is made of a metal, such as steel.

It should be clear at this time that a rod holding device has been provided which advantageously incorporates a slide hammer for easily driving a stake into the ground and which is formed with a few components which are easily assembled and provides for a carrying strap and bolts for stabilizing both the rod being supported and the supporting stake. However, the present invention is not to be construed as limited to the forms shown which are to be considered illustrative rather than restrictive.

I claim:

1. A rod holding apparatus comprising:

an elongated rod holding tube having a side and two end portions, one end portion being adapted to removably hold a rod therein, said elongated rod holding tube having a hand guard fixedly attached to the side thereof;

an elongated stake having a head on one end and being generally pointed on the other end thereof;

an elongated stake guide fixedly attached in and extending from said rod holding tube other end portion for slidably supporting said stake therein, said stake guide having a stake head stop on one end thereof to thereby block said stake from sliding from said elongated rod holding tube; and a hammering member fixedly attached in said elongated rod holding tube between the ends thereof and slidable with said elongated rod holding tube to impact onto said stake head when sliding said elongated rod holding tube on said stake said hammering member including a metal rod extending through said elongated rod holding tube and having cushioning attached therearound;

whereby an elongated rod holding tube has a slide hammer for driving an elongated stake into the earth.

2. The rod holding apparatus in accordance with claim 1 including a weight member attached in said elongated rod holding tube adjacent said hammering member.

3. The rod holding apparatus in accordance with claim 2 including a stake locking bolt threadedly attached into said elongated rod holding tube and into said stake guide for locking said elongated stake to said elongated rod holding tube and to said stake guide.

4. The rod holding apparatus in accordance with claim 3 said hammering member includes a rod locking bolt threadedly attached through said elongated rod holding tube.

5. The rod holding apparatus in accordance with claim 4 including a carrying strap removably attached between said rod locking bolt and said stake locking bolt.

\* \* \* \* \*